(12) United States Patent
Bilzor

(10) Patent No.: US 11,132,437 B2
(45) Date of Patent: Sep. 28, 2021

(54) SECURE COMPUTER OPERATING SYSTEM THROUGH INTERPRETED USER APPLICATIONS

(71) Applicant: The Government of the United States of America, as represented by the Secretary of the Navy, Arlington, VA (US)

(72) Inventor: Michael Bilzor, Millersville, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 291 days.

(21) Appl. No.: 16/260,260

(22) Filed: Jan. 29, 2019

(65) Prior Publication Data
US 2019/0392134 A1 Dec. 26, 2019

Related U.S. Application Data

(60) Provisional application No. 62/689,862, filed on Jun. 26, 2018.

(51) Int. Cl.
*G06F 21/51* (2013.01)
*G06F 21/62* (2013.01)
*G06F 21/55* (2013.01)

(52) U.S. Cl.
CPC ............ *G06F 21/51* (2013.01); *G06F 21/556* (2013.01); *G06F 21/62* (2013.01); *G06F 2221/033* (2013.01); *G06F 2221/2113* (2013.01)

(58) Field of Classification Search
None
See application file for complete search history.

(56) References Cited

U.S. PATENT DOCUMENTS

| | | | |
|---|---|---|---|
| 7,530,093 B2 | 5/2009 | Samuelsson et al. | |
| 7,743,425 B2 * | 6/2010 | Ganesh | H04L 63/105 |
| | | | 726/30 |
| 8,272,048 B2 | 9/2012 | Cooper et al. | |
| 8,285,958 B1 * | 10/2012 | Sallam | G06F 12/145 |
| | | | 711/165 |
| 8,397,290 B2 | 3/2013 | Coles et al. | |
| 8,468,344 B2 | 6/2013 | Teijido et al. | |
| 8,646,100 B2 | 2/2014 | Swingler et al. | |
| 8,756,417 B1 | 6/2014 | Gardner | |
| 9,069,706 B2 | 6/2015 | Sriram et al. | |
| 9,390,241 B2 | 7/2016 | Swingler et al. | |
| 9,734,327 B2 | 8/2017 | Martel et al. | |
| 9,916,475 B2 | 3/2018 | Enck et al. | |
| 2006/0117305 A1 * | 6/2006 | Tarkkala | G06F 9/45508 |
| | | | 717/139 |
| 2006/0198358 A1 * | 9/2006 | Beckwith | H04L 63/0428 |
| | | | 370/351 |

(Continued)

*Primary Examiner* — Michael Pyzocha
(74) *Attorney, Agent, or Firm* — US Naval Research Laboratory; William P. Ladd

(57) ABSTRACT

Systems, methods, and devices are provided for eliminating binary-level exploitable vulnerabilities in computer systems, making the computer systems more secure. Embodiments of the present disclosure can improve security using a computer system that can force user applications to be interpreted high-level language code, permitting the implementation of several well-defined security mechanisms in the computer system.

20 Claims, 12 Drawing Sheets

(56) References Cited

U.S. PATENT DOCUMENTS

| | | | |
|---|---|---|---|
| 2010/0131637 A1* | 5/2010 | Joshi | G06F 9/54 709/224 |
| 2011/0107430 A1* | 5/2011 | Graham | G06F 21/57 726/27 |
| 2013/0290729 A1* | 10/2013 | Pettigrew | G06F 21/51 713/187 |
| 2014/0041026 A1* | 2/2014 | Scott | G06F 9/45508 726/22 |
| 2014/0325684 A1* | 10/2014 | Takeyasu | H04L 9/3271 726/29 |
| 2015/0052616 A1* | 2/2015 | Hutchison | G06F 21/57 726/27 |
| 2015/0089238 A1* | 3/2015 | Lewis | H04L 9/3236 713/183 |
| 2017/0154181 A1* | 6/2017 | Venkataramani | G06F 21/556 |
| 2019/0042781 A1* | 2/2019 | Lukacs | G06F 21/80 |
| 2019/0050576 A1* | 2/2019 | Boulton | G06F 21/562 |
| 2019/0065223 A1* | 2/2019 | DiTullio | G06F 9/4552 |
| 2020/0272482 A1* | 8/2020 | Eyberg | G06F 9/541 |

* cited by examiner

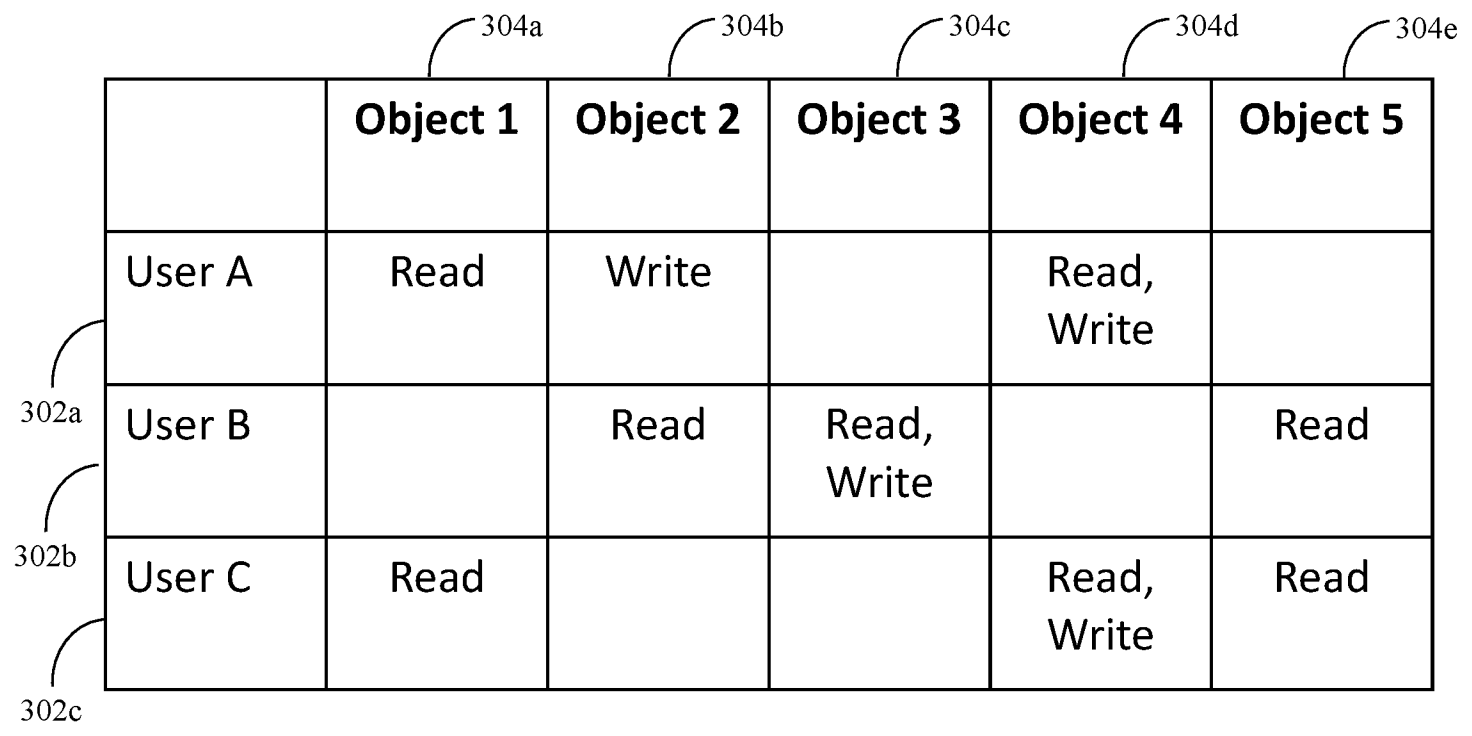

|        | Object 1 | Object 2 | Object 3 | Object 4 | Object 5 |
|--------|----------|----------|----------|----------|----------|
| User A | Read | Write |  | Read, Write |  |
| User B |  | Read | Read, Write |  | Read |
| User C | Read |  |  | Read, Write | Read |

FIG. 3

SECURE COMPUTER OPERATING SYSTEM THROUGH INTERPRETED USER APPLICATIONS

CROSS REFERENCE TO RELATED APPLICATIONS

This application claims the benefit of U.S. Provisional Patent Application No. 62/689,862, filed on Jun. 26, 2018, which is incorporated by reference herein in its entirety.

FIELD OF THE DISCLOSURE

This disclosure relates to computer systems, including security for computer systems.

BACKGROUND

Much of computer system security, as commonly practiced today, focuses on known vulnerabilities and exploitation techniques at the binary level. For example, system-based binary defense includes stack protections, such as stack *canaries*. Stack protections are effective at preventing only the simplest stack-based buffer overflow attacks and can be bypassed using format string attacks, placing shellcode in the environment variables, return-oriented programming, and other techniques.

System-based binary defense further includes Data Execution Prevention (DEP, sometimes called no-execute or NX). With the assistance of the CPU, the operating system marks writable data pages as not executable. Attackers can bypass DEP using return-oriented programming or by placing shellcode in memory areas that the operating system needs to be both writable and executable.

System-based binary defense further includes Address Space Layout Randomization (ASLR). ASLR helps defeat binary attacks that jump to shellcode by randomizing the address at which executables are loaded into memory. ASLR can also be defeated using return-oriented programming.

System-based binary defense further includes using digital signatures. Modern operating systems can be configured to only execute binaries that have a trusted digital signature. However, malicious actors can often obtain signing certificates from untrustworthy vendors, and users are often permitted to bypass such restrictions for ease of use.

System-based binary defense further includes anti-malware programs that attempt to recognize malicious binaries by their digital signature or using behavioral heuristics. However, anti-malware can be defeated using obfuscation and polymorphism and is limited to detecting malicious binaries that look like or behave similarly to other known malware.

System-based binary defense further includes control-flow protections, such as SEHOP protection, ROP mitigations, and similar features like those found in the Windows Enhanced Mitigation Experience Toolkit (EMET). Control-flow protections can effectively deter control-flow hijack when attackers use techniques like exception-stealing and return-oriented programming, but these protections are often not universally applied to all system software or can be bypassed using specialized techniques.

One thing these defenses all have in common is they all apply only at the binary level. The defender's challenge is that an attacker's ability to exploit a computer system using binary vulnerabilities only increases with the complexity of the system, and applications like browsers are built from 100 million or more lines of source code. The more binary software applications and shared libraries on a system, and the larger they are, the greater its potential attack surface.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings:

FIG. 3 is a diagram of an exemplary access control list (ACL) that can be used by a reference monitor in accordance with an embodiment of the preset disclosure;

Figure 1:
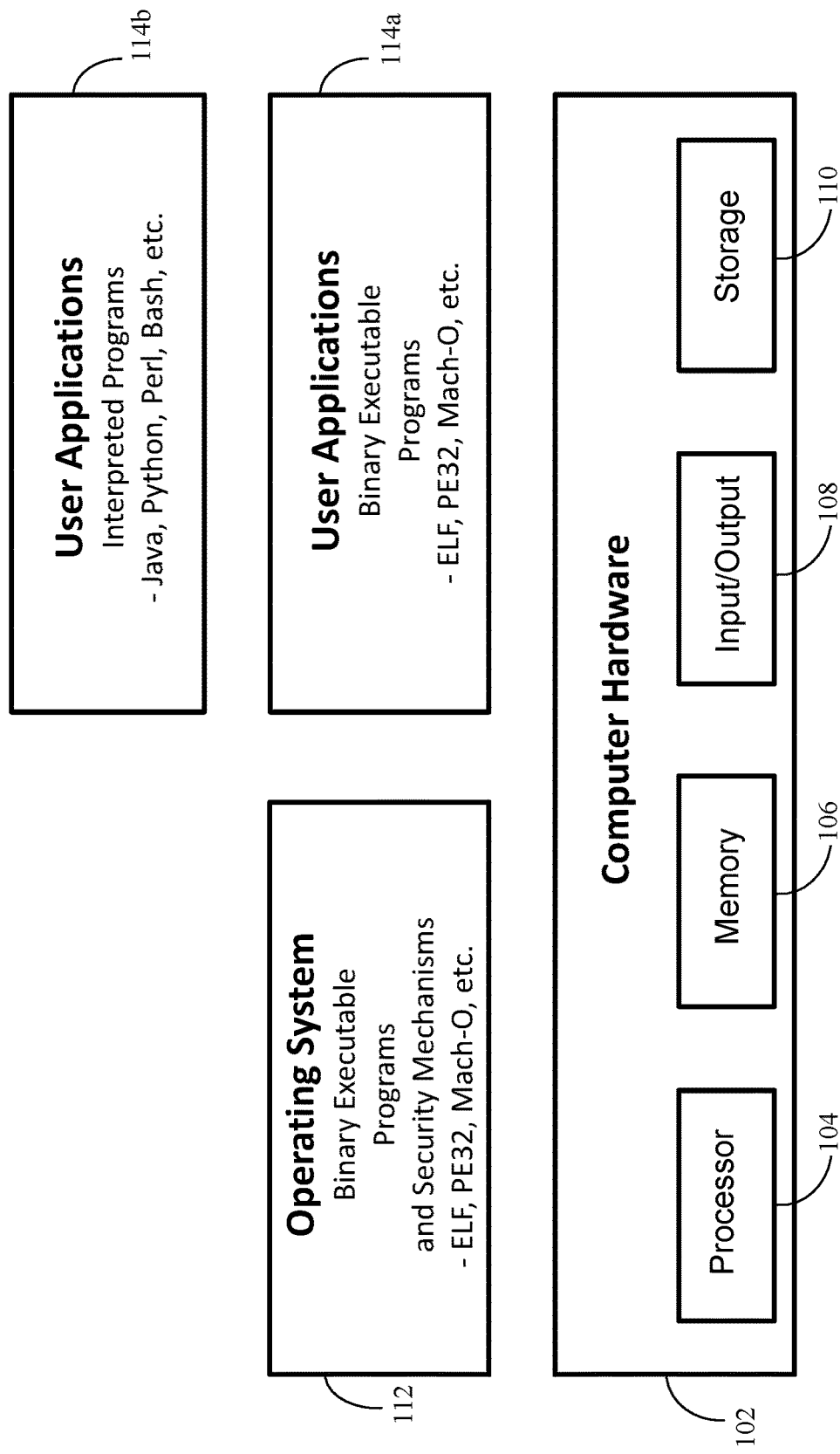
FIG. 1 is a diagram illustrating an exemplary computer system.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. OVERVIEW

Embodiments of the present disclosure provide systems, methods, and devices for eliminating binary-level exploitable vulnerabilities in computer systems, making them more secure. Embodiments of the present disclosure can improve security using a computer system that can force user applications to be interpreted high-level language code, permitting the implementation of several well-defined security mechanisms in the computer system.

2. SYSTEMS

The semantics of what defines a 'secure' or 'non-secure' action are not always well defined at the binary level. A simple and effective way to preclude attacks is to prevent user applications from running as compiled binaries altogether. Although most user applications such as browsers, editors, and games run in a compiled binary executable format, such as Executable and Linkable Format (ELF) or Portable Executable (PE) format (e.g., PE32), interpreted applications have been around for many years.

Interpreted applications can be designed to be executed by an interpreter, which can execute instructions written in a programming language without requiring these instructions to have been previously compiled into machine language. For example, Java programs can be "compiled" down to bytecode format and run inside an interpreter. Scripted languages like Python, Perl, and PowerShell can also run in an interpreter. Interpreted software usually executes more slowly than its compiled counterpart, making it less suitable for high-performance applications. However, in accordance with an embodiment of the present disclosure, requiring all applications to be interpreted can make it much easier to implement security policies in a computer system.

FIG. 1 is a diagram illustrating an exemplary computer system. In FIG. 1, computer hardware 102 includes at least one processor 104 (e.g., a central processing unit (CPU) and/or a graphical processing unit (GPU)) and at least one memory 106 (e.g., random access memory (RAM)). Computer hardware 102 can also include input/output device(s) 108, storage device(s) 110, and additional components, such as peripherals.

In FIG. 1, operating system 112 and user applications 114a can execute directly on computer hardware 102 (e.g., using processor 104 and memory 106). Operating system 112 and user applications 114a can run executable programs and/or security mechanisms as binary executable programs (e.g., using ELF, PE32, Mach Object (Mach-O), etc.). As discussed above, many computer vulnerabilities can arise from executing user applications as binary executable programs. FIG. 1 also includes user applications 114b that can execute as interpreted programs (e.g., using Java, Python, Perl, Bash, etc.). Current computer systems commonly permit both types of user applications (binary executable user applications or interpreted user applications), making those systems susceptible to binary executable vulnerabilities. Further, security mechanisms within the operating system 112 can be bypassed by attackers.

Figure 2A:
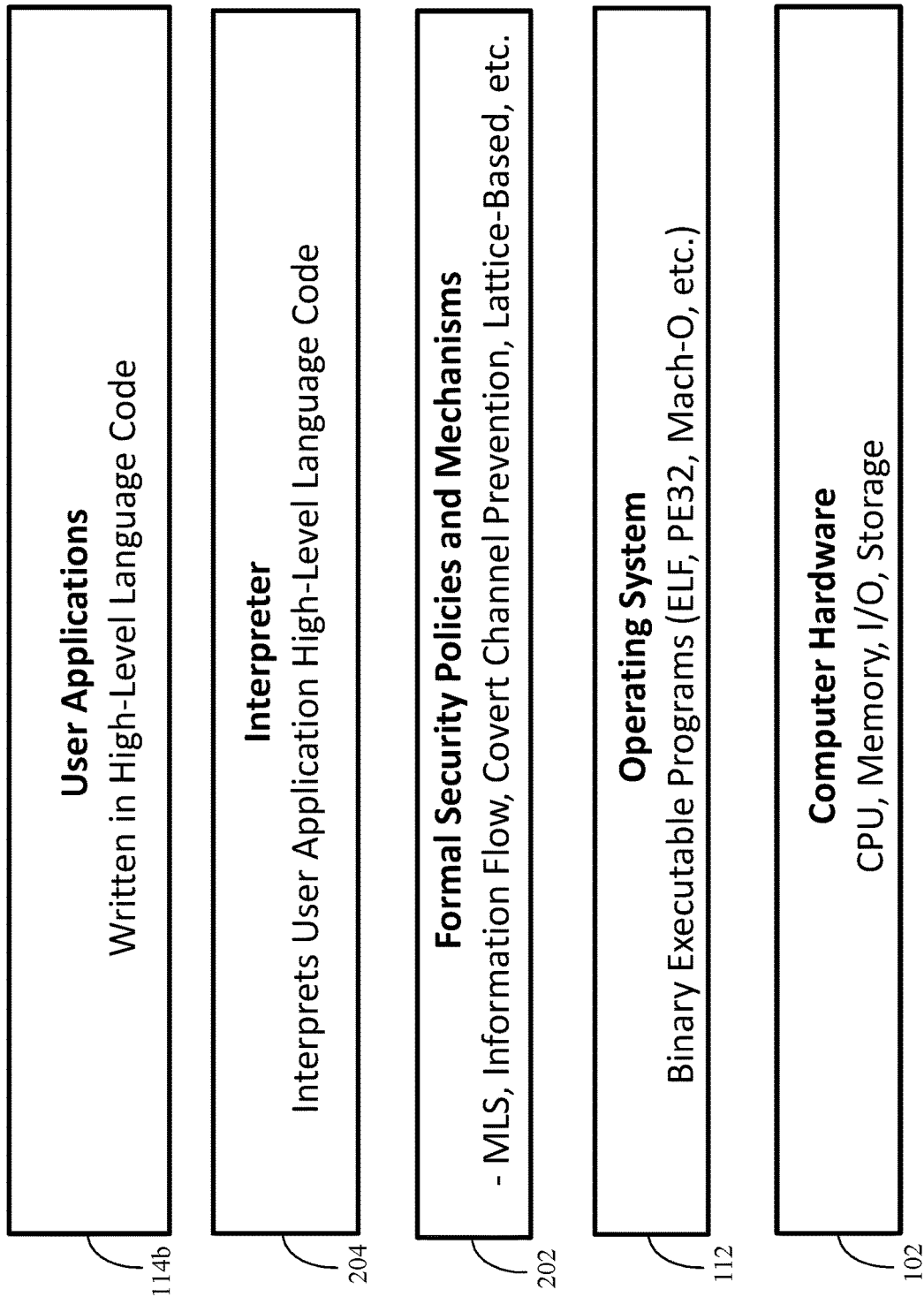
FIG. 2A is a diagram illustrating an exemplary secure computer system with an interpreter in accordance with an embodiment of the present disclosure.

FIG. 2A is a diagram illustrating an exemplary secure computer system with an interpreter in accordance with an embodiment of the present disclosure. In the secure computer system design of FIG. 2A, user applications 114b consist only of high-level language interpreted commands instead of compiled binary executable programs or intermediate representations, such as "bytecode."

For example, most vulnerabilities in current computer systems derive from errors that permit an attacker to run arbitrary binary executable code. Embodiments of the present disclosure permit an operating system (e.g., operating system 112) to be designed in such a way that all user applications are written in interpreted high-level language code, rather than compiled code or intermediate representations such as bytecode. This separation enhances and simplifies security of the system by preventing attackers from exploiting application flaws to execute binary code, such as shellcode.

The secure computer system of FIG. 2A further includes formal security policies and mechanisms 202 (e.g., implemented using multilevel security (MLS), information flow, covert channel prevention, lattice-based mechanisms, etc.) and an interpreter 204 that interprets user application high-level language code. In an embodiment, since formal security policies and mechanisms 202 are implemented in conjunction with operating system 112 and are applied to user applications 114b running as interpreted code, formal security policies and mechanisms 202 cannot be bypassed by user applications 114.

Embodiments of the present disclosure can take at least two forms. In a first form, an existing computer system, implementing a common commercial architecture, such as the Intel/Advanced Micro Devices (AMD) x86/x64, Advanced RISC Machine (ARM), or Microprocessor without Interlocked Pipelined Stages (MIPS) processors, and an existing operating system (OS), such as Linux, Windows, or MacOS, is adapted to execute only interpreted application programs (e.g., user applications 114b) and not execute any compiled application programs or intermediate representations, such as bytecode. In an embodiment, once the computer system is adapted, security controls that implement formally specified security policies (e.g., formal security policies and mechanisms 202) can be implemented in the computer system.

In a second form, an entirely new computer system can be developed rather than adapting an existing computer system. In an embodiment, the new computer system can be based on an existing computer architecture, such as the Intel/AMD x86/x64, ARM, or MIPS processors, for example, or can be based on a new computer architecture. Regardless of the architecture chosen, in an embodiment the computer operating system is new and is not derived from an existing operating system. Any of the embodiments listed below can be implemented using either the first form, the second form, and/or some combination of the two.

In an embodiment, all application program code (e.g., code for user applications 114*b*) is interpreted from its high-level language representation rather than compiled to a binary executable or bytecode format. In an embodiment, by interpreting all application program code, operating system code (e.g., code for operating system 112) can be separated from application code (e.g., code for user applications 114*b*), in that programs for operating system 112 can be either compiled binaries or interpreted, but programs for user applications 114*b* can only be interpreted high-level language code, never compiled executable binaries, such as PE32, ELF, or Mach-O, for example, or intermediate representations such as bytecode (e.g., Java bytecode or Python bytecode).

In an embodiment, operating system 112 of the secure computer system of FIG. 2A can contain typical operating system features, such as a kernel, device drivers, kernel modules, file systems, processes and threads, a scheduler, system calls, virtual memory, and hardware and software interrupts. However, in an embodiment, operating system 112 differs from a typical operating system in a number of ways. For example, in an embodiment, operating system 112 has an interpreter for high-level application language, in which user applications 114*b* are written.

In the secure computer system of FIG. 2A, operating system 112 and/or interpreter 204 prohibit any binary that was not part of the original operating system 112 installation from executing code. In an embodiment, operating system 112 and/or interpreter 204 prohibit direct interaction by users or user applications 114*b* with the existing operating system 112 binaries (other than the binaries of interpreter 204 used to interpret user applications 114*b*). For example, in an embodiment, operating system 112 and/or interpreter 204 can be configured to know in advance any and all binaries that could possibly run on the computer system. In an embodiment, all binaries that could run on the computer system can be digitally signed and could together comprise a trusted computing base (TCB). Further, in an embodiment, operating system 112 can be configured to prohibit direct user interaction with existing operating system binaries.

In an embodiment, the computer system of FIG. 2A can use two operating system schedulers: a main scheduler used for binary processes and threads belonging to operating system 112 and an application scheduler controlling execution of non-interactive interpreted user-level applications (e.g., a mail client daemon or a web server). In an embodiment, when an interpreted application launches, several application support OS process can be created in tandem, including a process to interpret the application's high-level code and keep track of the application state and potentially others to handle application I/O.

In accordance with the present disclosure, operating system security in the computer system of FIG. 2A is improved because, by preventing user applications 114*b* from running arbitrary binary code, the "attack surface" of the computer system is reduced. In an embodiment, instead of all binary code for operating system 112 (often hundreds or thousands of programs) being subject to subversion by binary code for user applications 114*b*, only the operating system application interpreter 204 is exposed to potential attack.

In an embodiment, the computer system of FIG. 2A can be implemented by adapting an existing computer system to execute only interpreted application programs and not execute compiled application programs or intermediate representations such as bytecode. In an embodiment, rather than adapting an existing computer system, a new computer system can be developed to implement the computer system of FIG. 2A.

In an embodiment, operating system 112, interpreter 204, formal security policies and mechanisms 202, and/or user applications 114*b* in the computer system of FIG. 2A can be implemented using hardware, software and/or a combination of hardware and software. For example, in an embodiment, operating system 112 and/or interpreter 204 can be implemented using software in a computer system, such as a personal computer. In an embodiment, operating system 112 and/or interpreter 204 can be implemented using a special purpose device (e.g., a tablet, mobile phone, etc.).

While interpreter 204 is shown implemented separate from operating system 112 in FIG. 2A, it should be understood that, in an embodiment, interpreter 204 can be implemented as a separate device (or as separate software) from that used to implement operating system 112 or integrated within operating system 112. For example, in an embodiment, interpreter 204 can be implemented in a secure memory and/or device accessible by operating system 112 or built into operating system 112.

2.1. Reference Monitor

In an embodiment, a reference monitor can be implemented by a computer system. A reference monitor in accordance with an embodiment of the present disclosure can enforce access by subjects (e.g., users and applications) to objects, such as files and/or sockets. In an embodiment, the reference monitor cannot be bypassed, can be evaluated for completeness, is always invoked, and is tamper-proof. In an embodiment, once subjects (e.g., users and applications) and objects (e.g., OS resources like files, sockets, memory pages, and data structures) are identified, any access by a subject to an object can be forced (e.g., by the operating system) to go through the reference monitor.

Figure 2B:
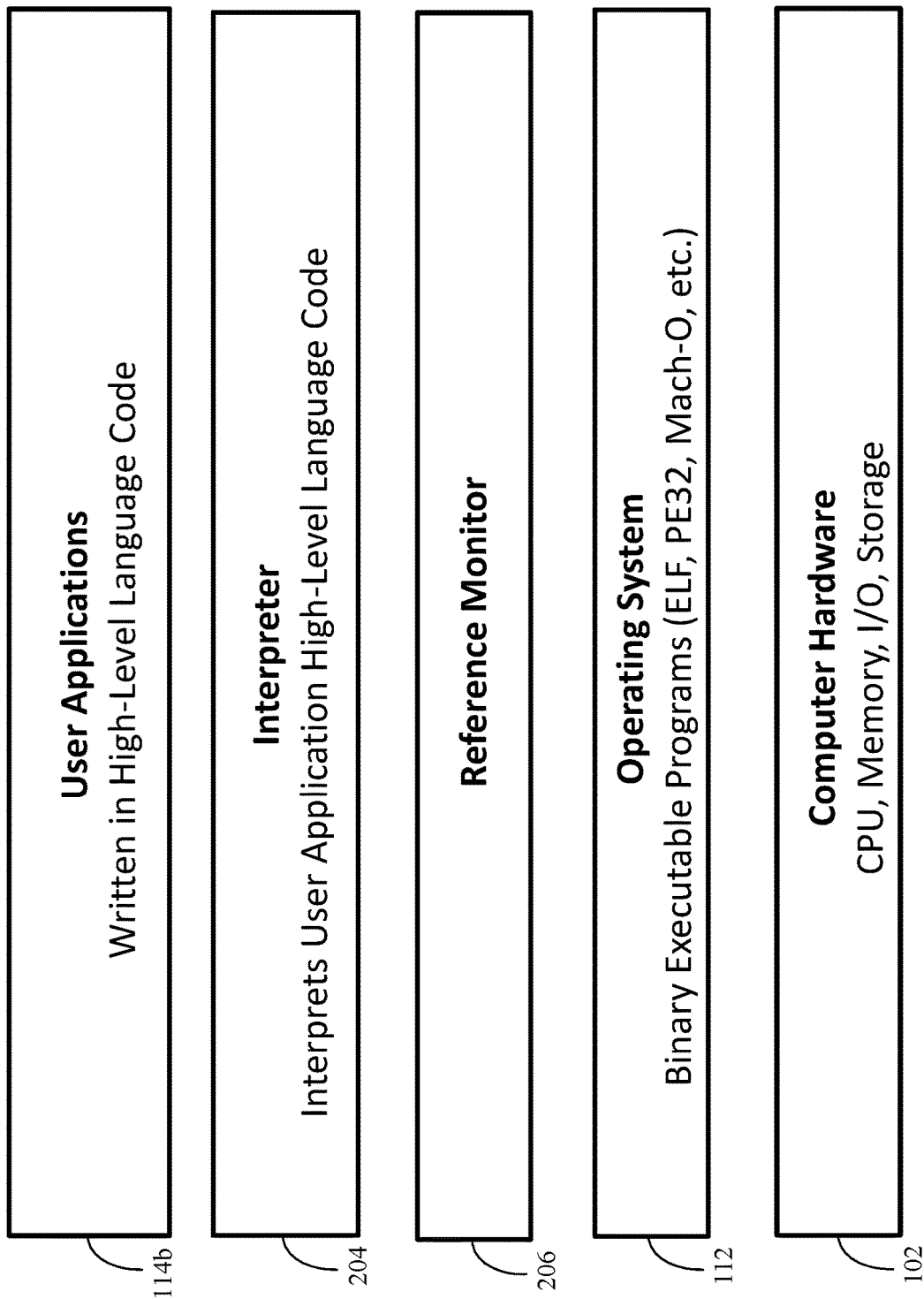
FIG. 2B is a diagram illustrating an exemplary secure computer system having an operating system with a reference monitor in accordance with an embodiment of the present disclosure.

FIG. 2B is a diagram illustrating an exemplary secure computer system having an operating system 112 with a reference monitor 206 in accordance with an embodiment of the present disclosure. In an embodiment, reference monitor 206 cannot be bypassed by user applications 114*b*. In an embodiment, reference monitor 206 implements access control decisions when requests for resources are made by applications (e.g., by user applications 114*b*). In an embodiment, reference monitor 206 is an integral part of operating system 112, making judgments about all accesses to resources made by user applications 114*b*. For example, in an embodiment, if an application requests read access to a file, reference monitor 206 either grants or denies access to the file by the application.

In an embodiment, reference monitor can be configured to use a security policy to determine whether to grant or deny access to the file. The security policy can be defined in protection domains, access control lists (ACLs), Capability Lists (CLs), or other policy mechanisms. The security policy can be either part of reference monitor 206 (e.g., part of the code and/or device implementing reference monitor) or can be stored in a secure location and/or device accessible by reference monitor 206 (e.g., as part of formal security policies and mechanisms 202, in a secure memory, etc.). The security policy can be fixed (e.g., stored in read-only memory) or configurable/updatable (e.g., by a system administrator) in accordance with embodiments of the present disclosure.

In an embodiment, because user applications 114*b* make requests using interpreted commands in a high-level language (including for example, but not limited to, programming languages like C++, Python, Swift, Java, Ada, PowerShell, etc.), reference monitor 206 can easily evaluate a request from a user application and make a decision based on policy rules in the security policy. Other attempts at implementing a reference monitor in an operating system have focused on access control requests at the binary level rather than at the level of interpreted application code. Using a practical to implement, semantically clear, and dynamically updatable reference monitor in accordance with embodiments of the present disclosure, the security of a computer system can be greatly enhanced.

In an embodiment, the computer system of FIG. 2B can be implemented by adapting an existing computer system to execute only interpreted application programs and not execute compiled application programs or intermediate representations such as bytecode. In an embodiment, rather than adapting an existing computer system, a new computer system can be developed to implement the computer system of FIG. 2B.

In an embodiment, operating system 112, reference monitor 206, formal security policies and mechanisms 202, and/or user applications 114b can be implemented using hardware, software and/or a combination of hardware and software. For example, in an embodiment, operating system 112 and/or reference monitor 206 can be implemented using software in a computer system, such as a personal computer. In an embodiment, operating system 112 and/or reference monitor 206 can be implemented using a special purpose device (e.g., a tablet, mobile phone, etc.).

While reference monitor 206 is shown implemented separate from operating system 112 in FIG. 2B, it should be understood that, in an embodiment, reference monitor 206 can be implemented as a separate device (or as separate software) from that used to implement operating system 112 or integrated into operating system 112. For example, in an embodiment, reference monitor 206 can be implemented in a secure memory and/or device accessible by operating system 112 or integrated into operating system 112.

FIG. 3 is a diagram of an exemplary access control list (ACL) that can be used by a reference monitor in accordance with an embodiment of the preset disclosure. The ACL of FIG. 3 sets exemplary read/write rights of users 302 for respective objects 304. For example, in FIG. 3, User A 302A can read from Object 1 304a but has no access to Object 3 304c. In an embodiment, reference monitor 206 enforces the access permissions of the ACL of FIG. 3.

2.2. Information Flow and Covert Channel Protections

In an embodiment, a computer system can be designed with integrated information flow protections. For example, in any computer system, information can flow from one application or process to another—from applications to the operating system, from the operating system to applications, or among various components of any of these. In an embodiment, if user applications are strictly implemented using interpreted high-level language code, a computer system can track the flow of information among the various applications and system components, such that information flow policies can be defined and enforced.

Enforcement of information flow protections in accordance with embodiments of the present disclosure can be accomplished in several ways. For example, in an embodiment, a computer system can implement lattice-based information flow security. In an embodiment, a computer system can analyze the information flow effects of code execution by performing dynamic slicing. In an embodiment, a computer system can detect or prevent covert channels, such as timing and storage channels, in real time.

For example, a covert channel can be detected by identifying an object (e.g., a shared resource) that is referenced by more than one process. In a computer system where all user applications 114b are interpreted, covert channels can be easily detected (e.g., during application testing or runtime). Once covert channels are detected, improper access of resources can be prevented (e.g., by operating system 112).

Figure 2C:
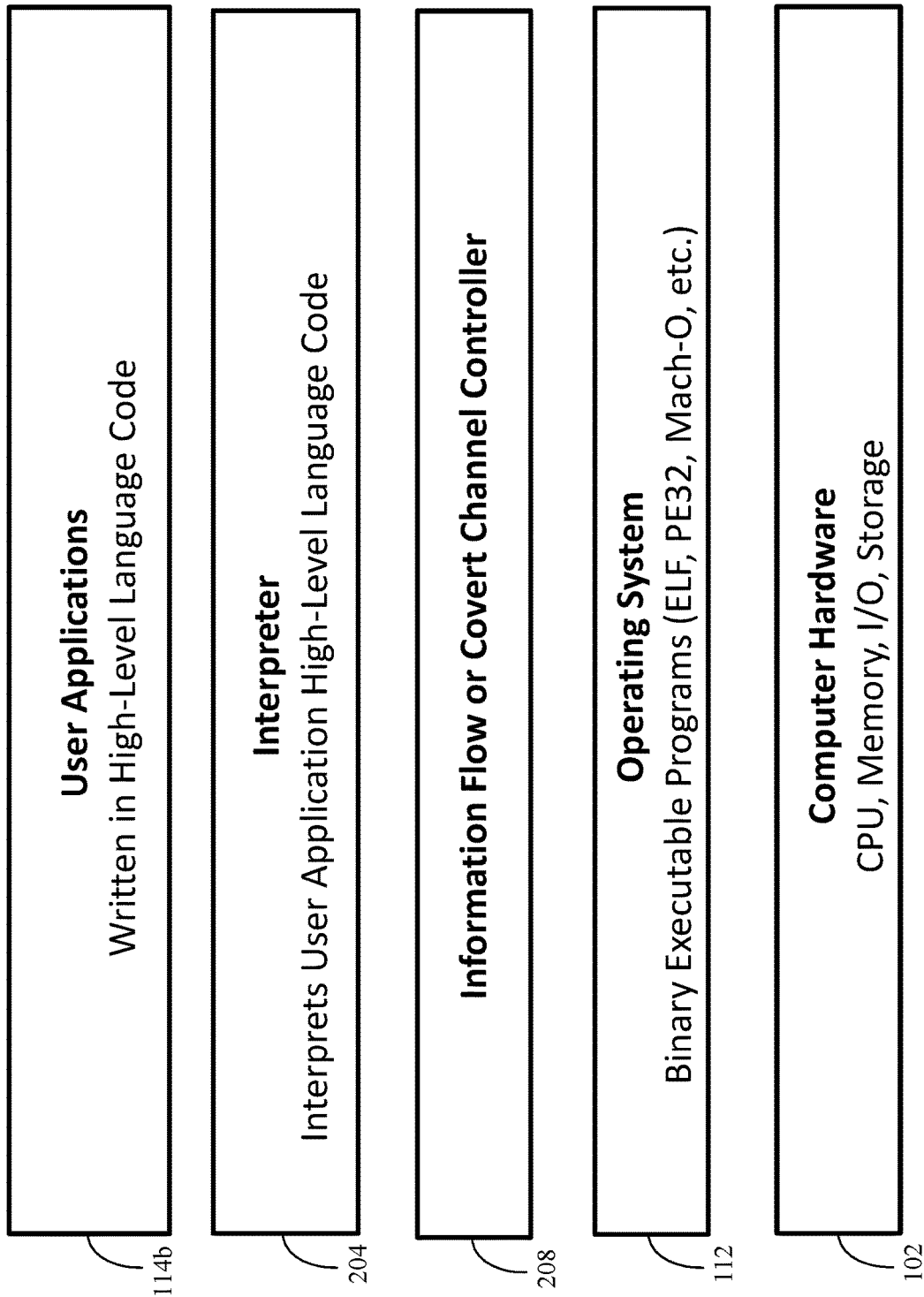
FIG. 2C is a diagram illustrating an exemplary secure computer system having an operating system with an information flow controller in accordance with an embodiment of the present disclosure.

FIG. 2C is a diagram illustrating an exemplary secure computer system having an operating system 112 with an information flow controller 208 in accordance with an embodiment of the present disclosure. In an embodiment, information flow controller 208 is configured to detect covert channels (e.g., during application testing or runtime) and to restrict (e.g., using a security policy) improper access of resources (e.g., improper access by user applications 114b to operating system 112, information flow controller 208, and/or to other user applications 114b. In an embodiment, information flow controller 208 can implement lattice-based information flow security. In an embodiment, information flow controller 208 can perform dynamic slicing.

In an embodiment, information flow controller 208 greatly enhances computer system security by making it possible to implement information flow and covert channel security protections dynamically, in real time, using the semantics of the high-level application code. Because, for example, the covert channel protections cannot be bypassed by user applications, the security of the computer system is greatly enhanced compared to current systems.

In an embodiment, the computer system of FIG. 2C can be implemented by adapting an existing computer system to execute only interpreted application programs and not execute compiled application programs or intermediate representations such as bytecode. In an embodiment, rather than adapting an existing computer system, a new computer system can be developed to implement the computer system of FIG. 2C.

In an embodiment, operating system 112, information flow controller 208, formal security policies and mechanisms 202, and/or user applications 114b can be implemented using hardware, software and/or a combination of hardware and software. For example, in an embodiment, operating system 112 and/or information flow controller 208 can be implemented using software in a computer system, such as a personal computer. In an embodiment, operating system 112 and/or information flow controller 208 can be implemented using a special purpose device (e.g., a tablet, mobile phone, etc.).

While information flow controller 208 is shown implemented separate from operating system 112 in FIG. 2C, it should be understood that, in an embodiment, information flow controller 208 can be implemented as a separate device (or as separate software) from that used to implement operating system 112 or integrated into the operating system 112. For example, in an embodiment, information flow controller 208 can be implemented in a secure memory and/or device accessible by operating system 112 or integrated into operating system 112.

Figure 4:
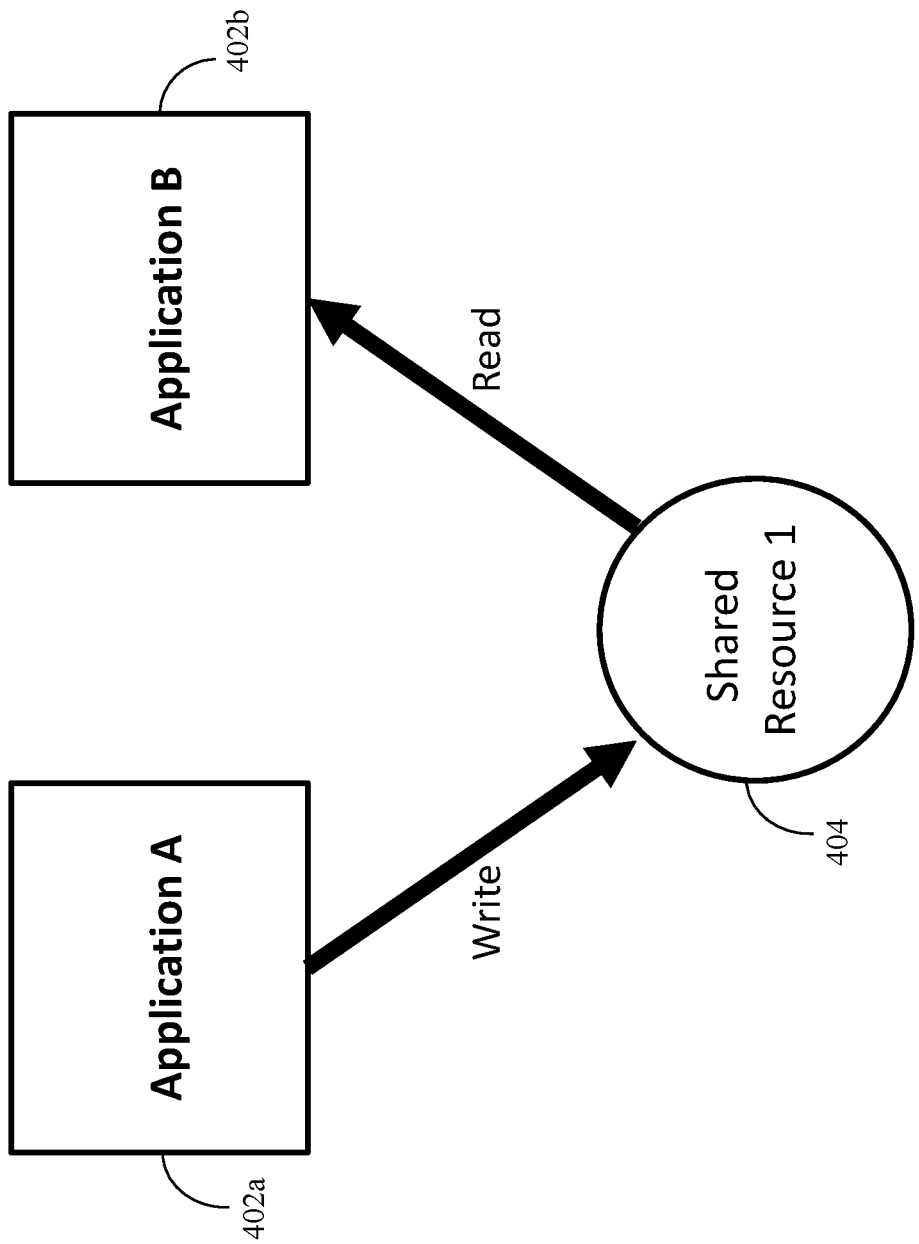
FIG. 4 is a diagram illustrating an exemplary covert storage channel in accordance with an embodiment of the present disclosure.

FIG. 4 is a diagram illustrating an exemplary covert storage channel in accordance with an embodiment of the present disclosure. In FIG. 4, a covert storage channel exists from Application A 402a to Application B 402b via a shared resource 404. Embodiments of the present disclosure allow for straightforward implementation of security controls to dynamically prevent such covert channels between applications.

2.3. Multi-Level Security

In an embodiment, a computer system can implement multi-level security (MLS). In an exemplary MLS system, there are subjects (such as users and the applications they run) and objects (such as files and other operating system resources). In an embodiment, each subject has a current security level, and each object has a defined security label. For example, in a military-style classification system, the security levels and security labels could be chosen from among a set such as {unclassified, confidential, secret, top_secret}. A MLS system can provide a framework for ensuring information confidentiality and can guarantee that information does not unintentionally leak from an object with a higher security label to a subject at a lower security level.

It is possible to implement an MLS computer system at the level of binary access and system calls, as in SELinux. However, such policies are tedious to create and cannot be updated dynamically, in real time, and are therefore not practical. An embodiment of the present disclosure can permit an MLS system to be implemented simply, with clearly defined semantics applied to the high-level application language, and updated dynamically, greatly enhancing operating system security by making MLS more practical to implement.

Figure 2D:
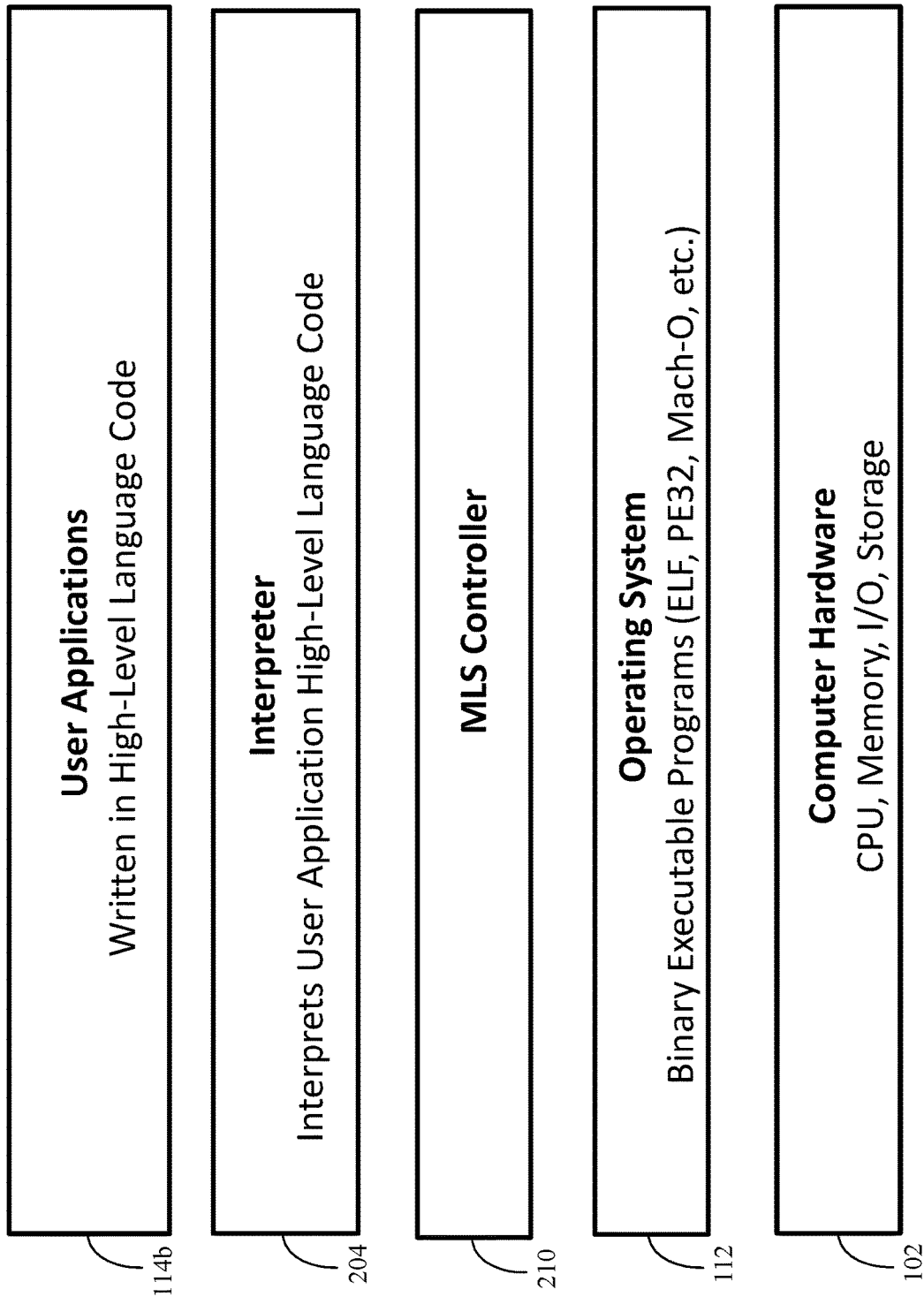
FIG. 2D is a diagram illustrating an exemplary secure computer system having a multi-level security (MLS) controller in accordance with an embodiment of the present disclosure.

FIG. 2D is a diagram illustrating an exemplary secure computer system having a multi-level security (MLS) controller in accordance with an embodiment of the present disclosure. In an embodiment, MLS controller 210 is configured to enforce (e.g., based on a security policy) MLS for subjects (e.g., user applications 114b) and objects (e.g., files and other resources of operating system 112b and/or other user applications 114b). For example, in an embodiment, MLS controller 210 can enforce MLS by ensuring that the security level of the subject is greater than (or, in an embodiment, greater than or equal to) the security level of the object.

In an embodiment, the computer system of FIG. 2D can be implemented by adapting an existing computer system to execute only interpreted application programs and not execute compiled application programs or intermediate representations such as bytecode. In an embodiment, rather than adapting an existing computer system, a new computer system can be developed to implement the computer system of FIG. 2D.

In an embodiment, operating system 112, MLS controller 210, formal security policies and mechanisms 202, and/or user applications 114b can be implemented using hardware, software and/or a combination of hardware and software. For example, in an embodiment, operating system 112 and/or MLS controller 210 can be implemented using software in a computer system, such as a personal computer. In an embodiment, operating system 112 and/or MLS controller 210 can be implemented using a special purpose device (e.g., a tablet, mobile phone, etc.).

While MLS controller 210 is shown implemented separate from operating system 112 in FIG. 2D, it should be understood that, in an embodiment, MLS controller 210 can be implemented as a separate device (or as separate software) from that used to implement operating system 112 or integrated into the operating system 112. For example, in an embodiment, MLS controller 210 can be implemented in a secure memory and/or device accessible by operating system 112 or integrated into operating system 112.

Figure 5:
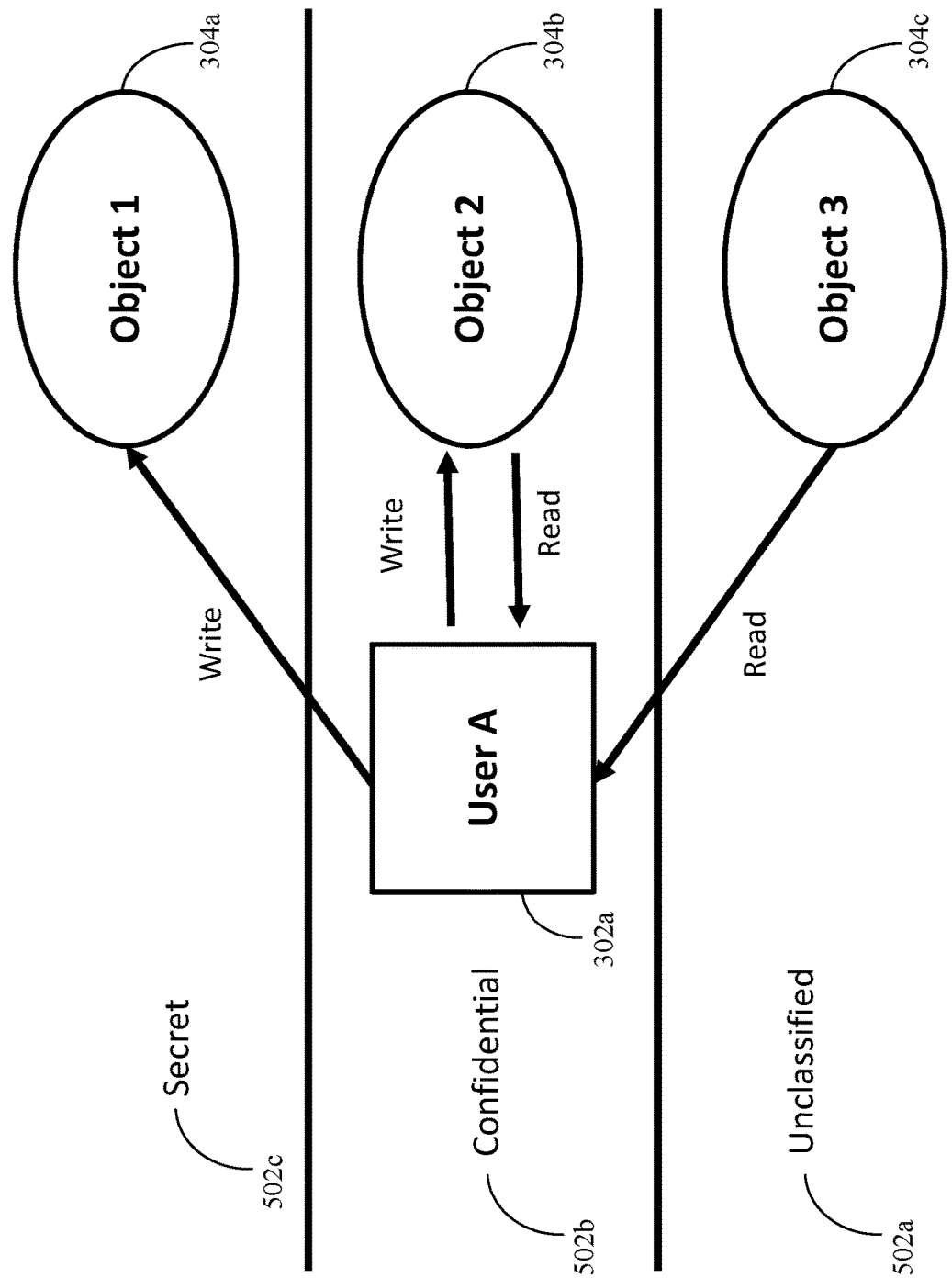
FIG. 5 is a diagram illustrating exemplary multi-level security (MLS) in accordance with an embodiment of the present disclosure.

FIG. 5 is a diagram illustrating exemplary multi-level security (MLS) in accordance with an embodiment of the present disclosure. In FIG. 5, MLS sets access rights for a user (User A 302a) to respective objects 304 at different security levels 502. Under normal MLS rules, User A 302a, operating at the level Confidential 502b, would be able to read and write to Object 2 304b, but would only be able to read Object 3 304c, and only be able to write (e.g., append) to Object 1 304a.

While interpreter 204, reference monitor 206, information flow controller 208, and MLS controller 210 are shown as being implemented separately with reference to FIGS. 2B-2D, it should be understood that embodiments of the present disclosure can include implementations of one, a plurality, and/or all of interpreter 204, reference monitor 206, information flow controller 208, and MLS controller 210. Further, it should be understood that interpreter 204, reference monitor 206, information flow controller 208, and MLS controller 210 can be implemented as parts of a single piece of software and/or hardware or as separate components of software and/or hardware in a computer system. For example, in an embodiment, interpreter 204 can be configured to perform the functionality of interpreter 204, reference monitor 206, information flow controller 208, and MLS controller 210. In an embodiment, interpreter 204, reference monitor 206, information flow controller 208, and MLS controller 210 are all implemented as part of a security module, which can be implemented using hardware, software, and/or a combination of hardware and software (e.g., implemented as part of operating system 112 or implemented using a separate device or program accessible by operating system 112).

3. EXEMPLARY METHODS

Figure 6A:
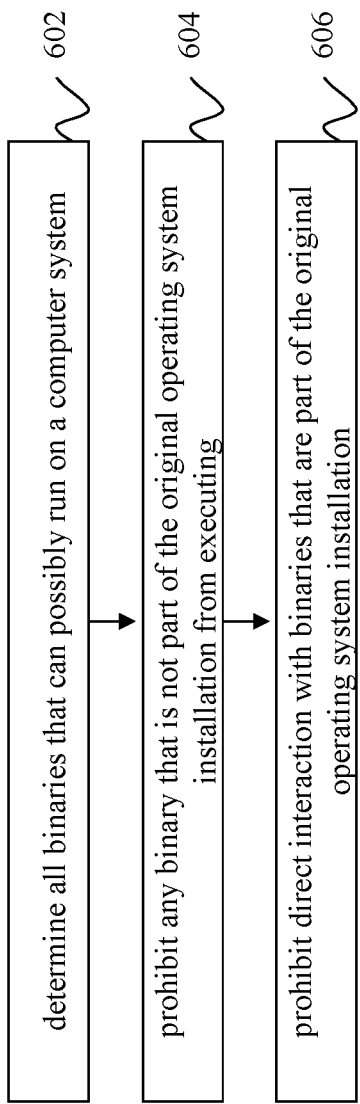
FIG. 6A is a flowchart of an exemplary method for ensuring security in a computer system in accordance with an embodiment of the present disclosure.

FIG. 6A is a flowchart of an exemplary method for ensuring security in a computer system in accordance with an embodiment of the present disclosure. In step 602, all binaries that can possibly run on a computer system are determined. For example, in an embodiment, operating system 112 and/or interpreter 204 can be configured to know in advance any and all binaries that could possibly run on the computer system. In step 604, any binary that is not part of the original operating system installation is prohibited from executing. For example, in an embodiment, all binaries that could run on the computer system can be digitally signed and could together comprise a trusted computing base (TCB). In an embodiment, operating system 112 and/or interpreter 204 can be configured to prohibit any binary without a trusted signature from executing on the computer system. In step 606, direct interaction with binaries that are part of the original operating system installation is prohibited. For example, in an embodiment, operating system 112 and/or interpreter 204 can be configured to prohibit direct interaction with binaries that are part of operating system 112.

Figure 6B:
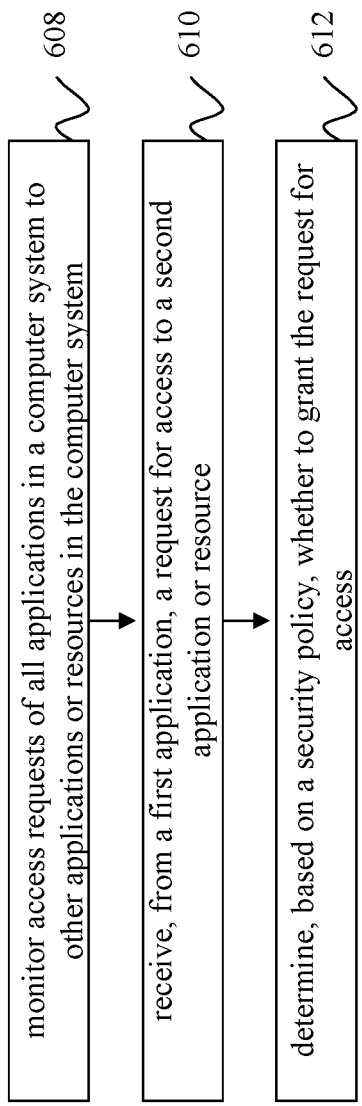
FIG. 6B is a flowchart of another exemplary for ensuring security in a computer system in accordance with an embodiment of the present disclosure.

FIG. 6B is a flowchart of another exemplary for ensuring security in a computer system in accordance with an embodiment of the present disclosure. In step 608, access requests of all applications in a computer system to other applications or resources in the computer system are monitored. For example, in an embodiment, reference monitor 206 is configured to monitor access requests of all applications (e.g., user applications 114b) in the computer system of FIG. 2C to other applications (e.g., other user applications 114b) or resources in the computer system of FIG. 2C. In step 610, a request is received from a first application for access to a second application or resource. For example, in an embodiment, reference monitor 206 receives a request for access from a first user application in user applications 114b to a resource in the computer system of FIG. 2C. In step 612, a determination is made, based on a security policy, whether to grant the request for access. For example, in an embodiment, reference monitor 206 determines whether to grant the request for access based on a security policy configured by a system administrator.

Figure 6C:
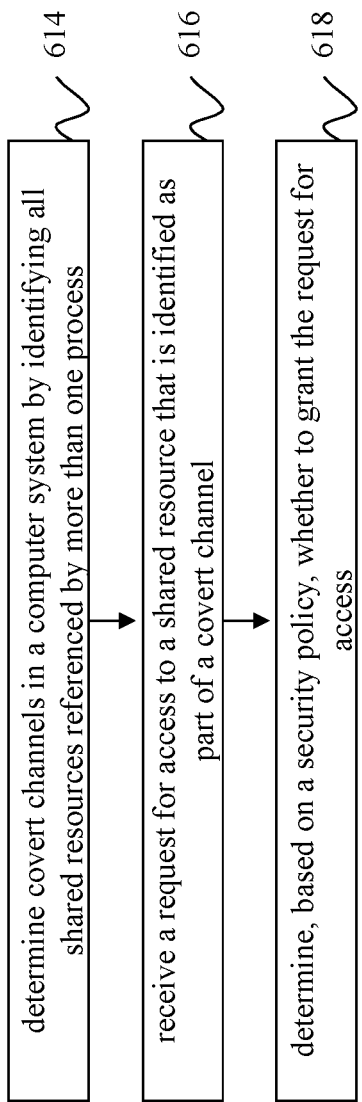
FIG. 6C is a flowchart of another exemplary for ensuring security in a computer system in accordance with an embodiment of the present disclosure.

FIG. 6C is a flowchart of another exemplary method for ensuring security in a computer system in accordance with an embodiment of the present disclosure. In step 614, covert channels in a computer system are determined by identifying all shared resources referenced by more than one process. For example, in an embodiment, information flow controller 208 can identify all potential covert channels during application testing or runtime. In step 616, a request for access to a shared resource that is identified as part of a covert channel is received. For example, in an embodiment, information flow controller 208 can receive a request for access to a shared resource that it identified as part of a covert channel. In step 618 a determination is made, based on a security policy, whether to grant the request for access. For example, in an embodiment, information flow controller 208 can determine whether to grant the request for access based on a security policy.

Figure 6D:
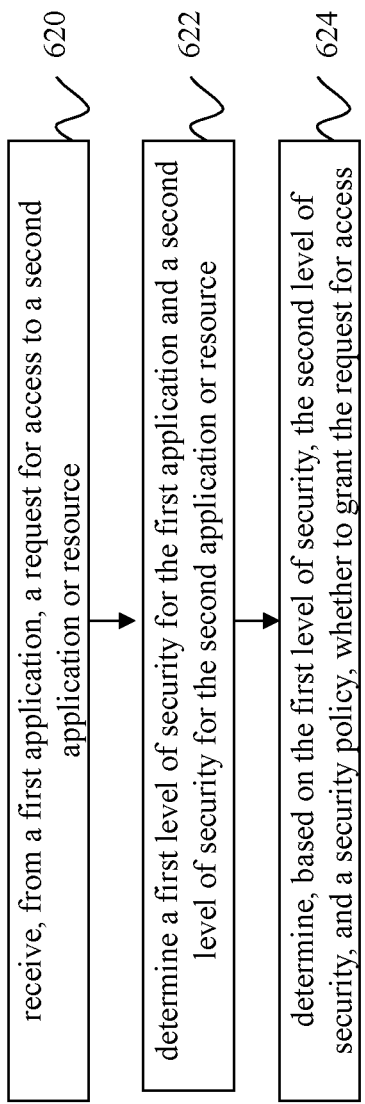
FIG. 6D is a flowchart of another exemplary for ensuring security in a computer system in accordance with an embodiment of the present disclosure.

FIG. 6D is a flowchart of another exemplary method for ensuring security in a computer system in accordance with an embodiment of the present disclosure. In step 620, a request is received from a first application for access to a second application or resource. For example, in an embodiment, MLS controller 210 receives a request for access from a first user application in user applications 114b to a resource in the computer system of FIG. 2D. In step 622, a first level of security for the first application and a second level of security for the second application or resource are determined. For example, in an embodiment, MLS controller 210 determines a first level of security for the first application and a second level of security for the resource. In step 624, a determination is made, based on the first level of security, the second level of security, and a security policy, whether to grant the request for access. For example, in an embodiment, MLS controller 210 determines, based on the first level of security, the second level of security, and a security policy, whether to grant the request for access.

4. EXEMPLARY ADVANTAGES

In addition to the benefits of improved security, embodiments of the present disclosure provide several other advantages. In an embodiment, since the application programming language would not depend on the computer system's architectural design, all applications would be portable across different implementations. For example, in an embodiment, if there were one implementation based on the Intel x64 architecture, another on an ARM architecture, and another on a SPARC V architecture, user applications would be portable across all of them.

In an embodiment, for certain shared resources, true deadlock detection and avoidance can be implemented. True deadlock detection and avoidance algorithms are not currently implemented on commercial systems. Parallelism within user applications, for improved performance, would be made easier by embodiments of the present disclosure.

In an embodiment, multiple operating system threads could be assigned to support each high-level application. For example, one thread can be parsing the code, another can be performing permission checks with the reference monitor, and another can be pre-fetching data that will be needed soon.

In an embodiment, independent sections of high-level application code can be identified statically or dynamically, through program slicing, a technique applied to high-level program code to identify what other sections of code (both backward and forward dependencies) affect a particular code object. Program slicing can be problematic at the level of binary machine code, but can be easily performed on high-level language code. Each program "slice" can be suitable for independent parallel execution. Slices, and the information flows they reveal, can also be useful in a security context.

5. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A secure computer system, comprising:
a processing device; and
an operating system, wherein the operating system is configured to:
determine a plurality of original binaries that can potentially execute on the processing device,
prohibit any binary that is not part of the plurality of original binaries from executing on the processing device,
prohibit any binary that is part of the plurality of original binaries from being modified by any binary that is not part of the plurality of original binaries,
require all programs to be executed on the secure computer system that are not part of the plurality of original binaries to be interpreted applications, wherein instructions for the interpreted applications are not in a binary format, and
execute the instructions for the interpreted applications.

2. The secure computer system of claim 1, further comprising:
a reference monitor configured to:
monitor access requests of all applications in the secure computer system to other applications or resources in the secure computer system;
receive, from a first application, a request for access to a second application or resource; and
determine, based on a security policy, whether to grant the request for access.

3. The secure computer system of claim 1, further comprising:
an information flow controller configured to:
determine covert channels in the secure computer system by identifying all shared resources referenced by more than one process;
receive a request for access to a shared resource that is identified as part of a covert channel; and
determine, based on a security policy, whether to grant the request for access.

4. The secure computer system of claim 1, further comprising:
a multi-level security (MLS) controller configured to:
enforce MLS for the interpreted applications;
receive, from a first application, a request for access to a second application or resource;
determine a first level of security for the first application and a second level of security for the second application or resource; and
determine, based on the first level of security, the second level of security, and a security policy, whether to grant the request for access.

5. The secure computer system of claim 1, wherein the operating system comprises:
a main scheduler configured to schedule the plurality of original binaries; and
an application scheduler configured to schedule the interpreted applications.

6. The secure computer system of claim 1, wherein the operating system comprises a trusted computing base (TCB), wherein the TCB comprises the plurality of original binaries, and wherein each binary in the plurality of original binaries is digitally signed.

7. The secure computer system of claim 1, wherein the interpreted applications comprise interpreted high-level language code.

8. A secure computer system, comprising:
a processing device;
a security module, wherein the security module is configured to:
determine a plurality of original binaries that can potentially execute on the processing device,
prohibit any binary that is not part of the plurality of original binaries from executing on the processing device,
prohibit any binary that is part of the plurality of original binaries from being modified by any binary that is not part of the plurality of original binaries,
require all programs to be executed on the secure computer system that are not part of the plurality of original binaries to be interpreted applications, wherein instructions for the interpreted applications are not in a binary format,
execute the instructions for the interpreted applications, and
monitor access requests of all applications in the secure computer system to other applications or resources in the secure computer system.

9. The secure computer system of claim 8, wherein the security module is further configured to:
receive, from a first application, a request for access to a second application or resource; and
determine, based on a security policy, whether to grant the request for access.

10. The secure computer system of claim 8, wherein the security module is further configured to:
determine covert channels in the secure computer system by identifying all shared resources referenced by more than one process.

11. The secure computer system of claim 10, wherein the security module is further configured to:
receive a request for access to a shared resource that is identified as part of a covert channel; and
determine, based on a security policy, whether to grant the request for access.

12. The secure computer system of claim 8, wherein the security module is further configured to enforce multi-level security (MLS) for the interpreted applications.

13. The secure computer system of claim 12, wherein the security module is further configured to:
receive, from a first application, a request for access to a second application or resource;
determine a first level of security for the first application and a second level of security for the second application or resource; and
determine, based on the first level of security, the second level of security, and a security policy, whether to grant the request for access.

14. A method, comprising:
- determining, using a processing device, a plurality of original binaries that can potentially execute on a computer system;
- prohibiting, using the processing device, any binary that is not part of the plurality of original binaries from executing on the computer system;
- prohibiting, using the processing device, any binary that is part of the plurality of original binaries from being modified by any binary that is not part of the plurality of original binaries;
- requiring, using the processing device, all programs to be executed on the secure computer system that are not part of the plurality of original binaries to be interpreted applications, wherein instructions for the interpreted applications are not in a binary format; and
- executing, using the processing device, the instructions for the interpreted applications.

15. The method of claim 14, further comprising:
- monitoring access requests of all applications in the computer system to other applications or resources in the computer system.

16. The method of claim 14, further comprising:
- receiving, from a first application, a request for access to a second application or resource; and
- determining, based on a security policy, whether to grant the request for access.

17. The method of claim 14, further comprising:
- determining covert channels in the computer system by identifying all shared resources referenced by more than one process.

18. The method of claim 17, further comprising:
- receiving a request for access to a shared resource that is identified as part of a covert channel; and
- determining, based on a security policy, whether to grant the request for access.

19. The method of claim 14, further comprising:
- enforcing multi-level security (MLS) for the interpreted applications.

20. The method of claim 14, further comprising:
- receiving, from a first application, a request for access to a second application or resource;
- determining a first level of security for the first application and a second level of security for the second application or resource; and
- determining, based on the first level of security, the second level of security, and a security policy, whether to grant the request for access.

* * * * *